United States Patent Office 2,927,846
Patented Mar. 8, 1960

2,927,846

DEHYDROGENATION APPARATUS

Peter W. F. Cochrane, Park M. Reilly, and Edmund P. Lewis, Sarnia, Ontario, and William J. L. Kearns, Corunna, Ontario, Canada, assignors to Polymer Corporation Limited, Sarnia, Ontario, Canada, a corporation of Canada Application July 18, 1956, Serial No. 598,604

2 Claims. (Cl. 23—288)

This invention relates to apparatus for use in the chemical industry. There are many processes, for example, catalytic processes, ion exchange processes and drying processes, prevalent in the chemical industry where a fluid is caused to contact a contact material in a confined space. In many instances it is desirable that the residence time, or the contact time, or both, be kept as small as possible. (In this specification the term "contact time" is taken to mean "that period of time when the fluid is in contact with the contact material," and the term "residence time" is taken to mean "that period of time including the contact time when the fluid is under conditions similar to those during contact.") It has been suggested minimizing the contact time and the residence time by injecting the fluid at a high velocity into the chamber containing the contact material. However, in many processes the contact material is mechanically weak and so the high velocity gas is deleterious to the contact material.

Hence, it was desired to provide apparatus wherein a stream of fluid at a relatively high velocity and passing through a conduit of small cross-section is caused to pass at a lower velocity through a bed of mechanically relatively weak contact material having a large cross-section. Special consideration has been given to the system in which a fluid consisting of a mixture of n-butylene and steam is to be passed through a bed of catalyst whereby to dehydrogenate the n-butylene to butadiene-1,3.

It is now well known to dehydrogenate n-butylene to butadiene-1,3 in the presence of steam and a catalyst the active ingredient of which is calcium nickel phosphate, and at a temperature of 950–1350° F. One example of a suitable catalyst is the one disclosed and claimed in United States Patent No. 2,442,320, issued May 25, 1948, to Andrew J. Dietzler et al. Such catalyst is normally used in the form of pellets which are mechanically relatively weak.

It is appreciated that the hydrocarbon should have a short total residence time in order to avoid undue destructive decomposition of the hydrocarbon. The residence time of the hydrocarbon prior to its passage through the catalyst has been minimized, for example, by thermocompressors, as in United States Patent No. 2,399,560 issued April 30, 1956, to E. V. Murphree.

In the present invention, the apparatus in which both the residence time and the contact time are shortened comprises a reactor comprising a shell, inlet means, outlet means, and a static bed of mechanically weak contact material situated between said inlet means and said outlet means; an external mixing system for said reactor connected to said inlet means, said external mixing system comprising a conduit, a first fluid inlet means to said conduit, a second fluid inlet means to said conduit, optionally a third fluid inlet means, and a pair of orifices in said conduit located adjacent said second fluid inlet means, one of said orifices being positioned upstream of said inlet and the other of said orifices being positioned downstream of said inlet; and an internal distribution system within said reactor connected to said inlet means, said internal distribution system comprising a downcomer attached to said inlet means, a frusto-conical hood surrounding the discharge end of said downcomer coaxial therewith to extend downwardly and radially to the peripheral walls of the shell to lie adjacent the peripheral area of said bed while being movable along the longitudinal axis of the downcomer, and a distributor depending from said downcomer, said distribution cooperating with and being located within said movable hood to redirect and convert a stream of fluid at a high velocity and of small cross-section to an outwardly radiating stream of fluid at a lower velocity distributed over the surface of the bed of contact material. In general, the "fluid" is a gas, usually a mixture of hydrocarbon and steam.

While the present invention is not limited to any particular hood or distributor constituting the internal distribution system, certain specific examples of such hood and such distributors will be described herein. The invention is not to be limited to these specific hoods and distributors which are merely preferred embodiments.

One suitable form of hood which has been found satisfactory as a component of the internal distribution system of the reactor of the present invention consists of a frusto-conical hood comprising a plurality of sectors independently movable between a closed operative position, by which term is meant "that position of the independent sectors of the hood wherein such sectors are assembled to form a frusto-conical hood which serves to confine the reactants emerging from the centrally disposed distributor to that space between the catalyst bed and the hood," and an open access position, by which term is meant "that position of the independent sectors of the hood wherein at least one, and preferably more than one, is or are displaced from the closed operative position in such a manner as to allow free access to the catalyst bed."

Various types of distributors have been found to be satisfactory as components of the internal distribution system of the reactor of the present invention. The common characteristic of such distributors is that they contain means adapted to redirect a stream of fluid at a high velocity and of small cross-section through a series of radial ports to convert said stream to an outwardly radiating stream of fluid at a lower velocity and distributed over a larger cross-section. However, at the high input velocities required for reduced residence and contact time, it has been found unsatisfactory to use redirecting and converting means which consist merely of a primary annular deflecting plate immediately downstream of the downcomer, and a perforated base plate, below the primary plate and parallel thereto. The primary plate served to force the single gaseous stream partially to leave the distributor through a plurality of ports in the wall thereof above said deflecting plate. The base plate served further to break up the stream emerging from the primary plate by forcing such stream to exit through ports in the walls of the distributor between the primary plate and the base plate and through the perforations in the base plate. Such means allowed sufficient high velocity fluid to impinge upon the bed of contact material that such material became pulverized, resulting in an undesirably high pressure drop through the bed. One manner successful in converting the fluid from a stream at high velocity to one at lower velocity resides in a distributor comprising first annular plate means positioned to deflect fluid discharged from the peripheral area of the discharge end of the downcomer, second plate means positioned for intercepting fluid discharged from the central area of the discharge end of the downcomer and a perforated envelope enclosing the discharge end of the downcomer and said first and second plate means.

Another distributor which is a satisfactory component of the internal distribution system of the reactor of the present invention is one comprising first annular plate means positioned to deflect fluid discharged from a peripheral area of the discharge end of the downcomer onto second annular plate means extending outwardly beyond an imaginary continuation of the surface of such discharge end and a plate at the bottom of said distributor positioned for deflecting fluid discharged from the central area of the discharge end of the downcomer. Usually, the hereinabove mentioned first annular plate means and second annular plate means consist of a single upper annular deflecting plate coaxial with the longitudinal axis of the downcomer and lying generally transverse and preferably in a plane transverse to said axis downstream of the discharge end of the downcomer. A preferred form of such distributor involves the enclosing of the deflecting plates with a perforated envelope, preferably a cylindrical one of wire mesh.

In the distributors described above, the deflecting plates may be supported by a plurality of spaced partitions located either between the bottom plate and the upper plate or between the upper plate and the mouth of the downcomer, or both, such partitions extending radially outwardly a distance dependent upon their position. If they are located between the upper and bottom plates, they usually extend radially from the inner periphery of the upper plate to the outer periphery of the bottom plate; if they are located between the upper plate and the mouth of the downcomer, they usually extend radially from the periphery of the downcomer to the outer periphery of the upper plate.

Figure 1:
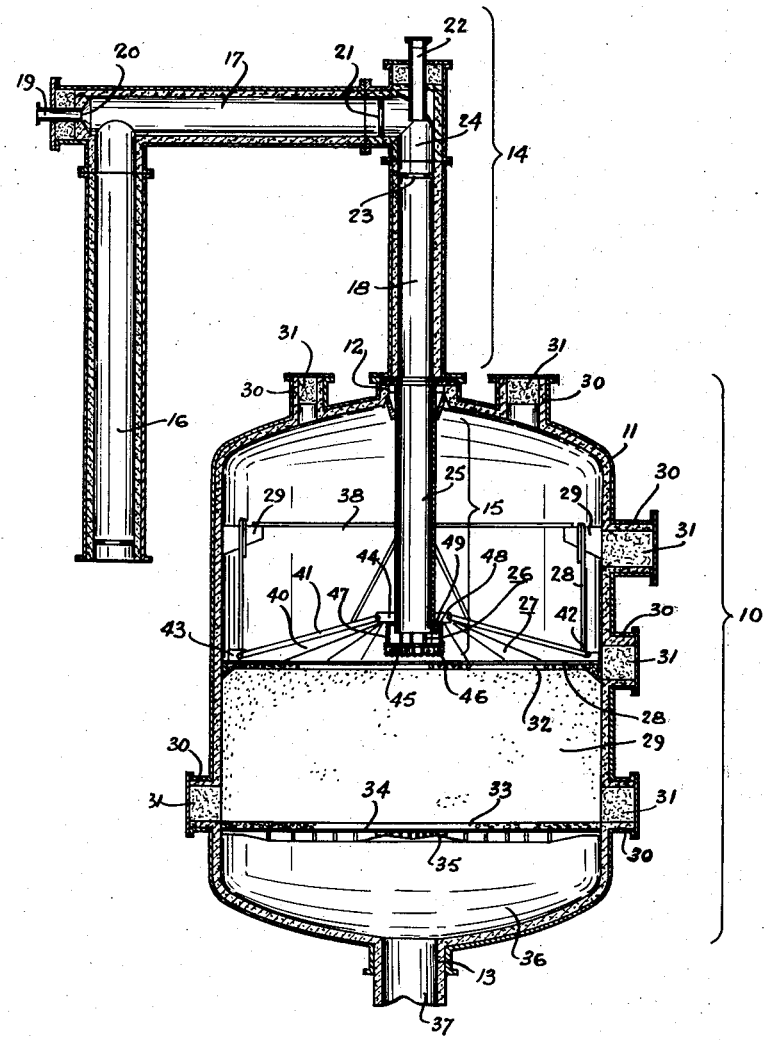
Figure 1 is a central vertical section of the apparatus of the present invention showing the reactor, the external mixing system and the internal distribution system.

It is seen from Figure 1 that the reactor is designated generally as 10 and consists of an insulated shell 11 equipped with inlet port 12 and outlet port 13. The top dome, as well as the side walls, of the vessel are equipped with manways 30, including insulating plugs 31. Attached to the inlet port 12 is the external mixing system designated generally as 14, and the internal distribution system designated generally as 15. The external mixing system allows any two or all three of three different high velocity fluids to be intimately mixed prior to admission to the reactor. In one particular case, that of the dehydrogenation of n-butylene to butadiene-1,3 in the presence of pelleted calcium nickel phosphate-chromium oxide catalyst, the reaction is a cyclic repetition of two phases. During one phase of each cycle a mixture of n-butylene and steam is passed through the catalyst in order to dehydrogenate the n-butylene to butadiene-1,3. During the other phase of each cycle, a mixture of steam and air is passed through the catalyst in order to burn off deposited coke, and so to regenerate the catalyst. The mixing system consists of steam pipe 16, connecting pipe 17 and inlet pipe 18. Connecting pipe 17 has an air inlet pipe 19 with its port 20, and an orifice 21. Inlet pipe 18 has a hydrocarbon inlet pipe 22 and an orifice 23. Thus, inlet pipe 22 has two orifices adjacent thereto, one at its upstream side and the other at its downstream side, the plates associated with such orifices serving to define a mixing chamber 24.

The operation of the external mixing system during dehydrogenation is as follows: high velocity steam passes along pipe 16, through pipe 17 and through orifice 21 into mixing chamber 24, where it is intimately mixed with hydrocarbon entering pipe 18 from pipe 22, and further mixed by passing the mixture through orifice 23, which temporarily increases the velocity thereby furthering the mixing. The mixture so produced is then admitted to the reaction vessel by means of internal distribution system 15.

During regeneration, the external mixing system operates as follows: steam passes along pipe 16 and is intimately mixed with air which enters pipe 17 from pipe 19 through port 20. The mixture is further admixed by passage through orifices 21 and 23 and is then admitted to the reaction vessel through internal distribution system 15.

The internal distribution system 15 consists of downcomer 25 terminating in the distributor shown generally as 26, and surrounded by a hood designated generally as 27. Hood 27 lies adjacent hold-down screen 28, which is separated from the bed of contact material 29 by Raschig rings 32. Hood 27 is permitted to be raised and lowered as the contact material expands and contracts. To prevent the hood from lowering too far with respect to distributor 26, hairpin shaped hangers 28 are provided which engage radially directed braces 29 and are hinged to hood 27. Such connection allows the hood to rest upon the bed of contact material 29 unless such bed is too low.

The bed of contact material rests on a layer of Berl saddles 33. The Berl saddles are supported by a screen 34 which rests on grate 35. The fluid material leaves the vessel through such grate 35, space 36, outlet port 13 and thence to outlet pipe 37.

In the drawing, the hood shown is one which is frusto-conical in shape and which is formed of a plurality of independent trapezoidal sectors 40 which are movable between a closed operative position and an open access position. (In this specification, the term "cone" is taken to means "the three dimensional figure bounded by a conical surface (lateral surface) whose directrix is a closed curve, and a plane (base) which cuts all the elements." In the above definition, the term "conical surface" is taken to mean "a surface generated by a moving straight line (generator) which always intersects a fixed closed plane curve (directrix) and which always passes through a fixed point (vertex) not in the plane of the curve," the term "element" is taken to mean "the generator from the vertex to the base," and the term "curve" is taken to mean "the locus traced by a point which periodically or continually deviates from a straight line." Thus, it is seen that the term "cone" includes those figures whose base is a circle, an ellipse or a polygon, and so is generic to the term "pyramid.") Each sector is bounded along its non-parallel sides by reinforcing ribs 41, which are hingedly connected by pin 42 to an angle bracket 43 which rests upon the hold-down screen 28. The unhinged top portion of the trapezoidal sectors are attached to ring 44 which surrounds but is not attached to the annular distributor. The trapezoidal sectors may be moved into open access position by raising the top portion and fastening them to ring 38.

Figure 2:
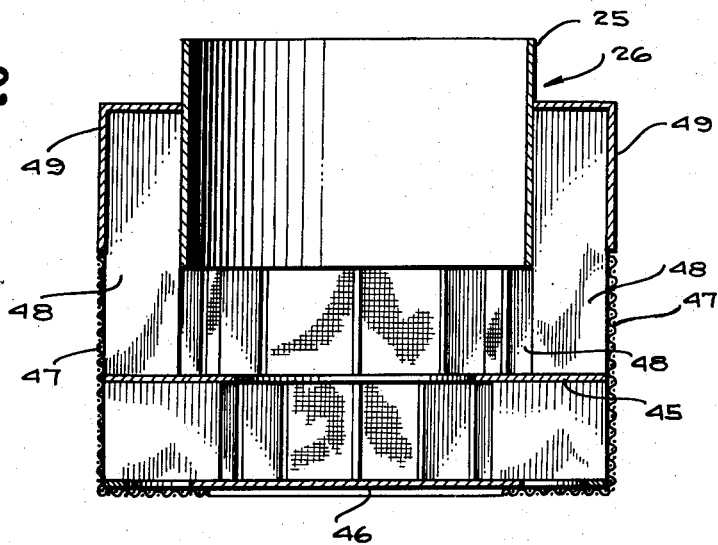
Figure 2 is an enlarged cross-sectional view of the distributor.
Figure 3:
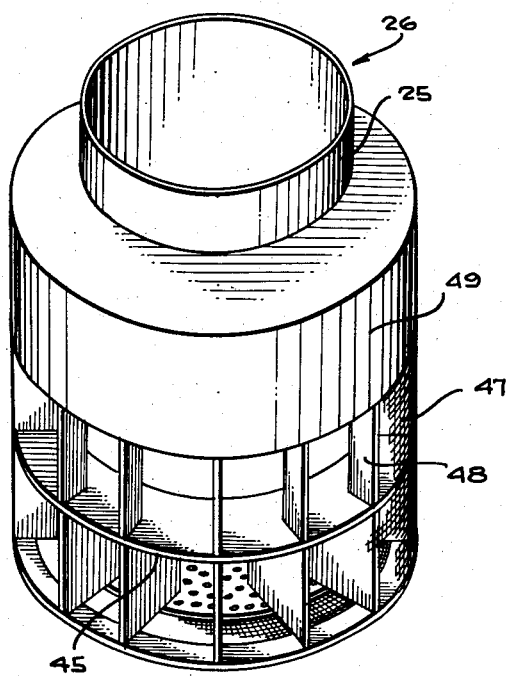
Figure 3 is a perspective view of the distributor.

The distributor shown more particularly in Figures 2 and 3 is one which consists of a top annular deflecting plate 45 which projects inwardly into the path of fluid discharged from a peripheral area of the discharge end of the downcomer 25 and outwardly beyond an imaginary continuation of the surface of such discharge end, a bottom perforated deflecting plate 46, a cylindrical wire mesh envelope 47 enclosing the discharge end of the downcomer and plate 45 and being contiguous with plate 46, and circumferentially spaced radiating partitions 48. The wire mesh envelope above the imaginary horizontal continuation of the bottom of the downcomer is an impervious cover 49.

What we claim is:

1. Apparatus comprising: a reactor comprising a shell, inlet means, outlet means, and a static bed of contact material situated between said inlet means and said outlet means; a mixing system completely external to said reactor and connected to said inlet means, said external mixing system comprising a conduit divided into three portions, first inlet means for admitting a first gas into a first portion of said conduit, second inlet means for admitting a second gas into a second portion of said conduit, first orifice means in said conduit, located immediately upstream of said second inlet means through which said first gas must pass from said first portion of said conduit to said second portion of said conduit whereby said first gas comes into contact with said second gas and results in an intimate admixture of said first gas and said second gas, and second orifice means in said conduit, located immediately downstream of said second inlet means through which said intimate admixture of said first gas and said second gas must pass from said second portion of said conduit to the third portion of said conduit, whereby said intimate mixture of said first gas and said second gas is maintained in such intimate admixture; and an internal distribution system completely within said reactor and connected to said inlet means, said internal distribution system comprising a downcomer attached to said inlet means, the cross-sectional area of said downcomer being small in comparison to the cross-sectional area of said reactor, a frusto-conical hood surrounding the discharge end of said downcomer coaxial therewith to extend downwardly and radially to the walls of the shell to lie adjacent to the peripheral area of said bed while being movable along the longitudinal axis of the downcomer, and a distributor attached to the discharge end of said downcomer, said distributor comprising an upper annular plate, located downstream of the discharge end of said downcomer, projecting inwardly into the path of gas discharged from the peripheral area of the downcomer and projecting outwardly beyond an imaginary continuation of the surface of the discharge end of the downcomer, whereby to convert the peripheral portion of said axially moving gas to a radially outwardly moving stream of gas, while permitting the central portion of said axially moving gas to pass unhindered therethrough, a bottom perforated plate lying in the path of gas discharged from the central area of the downcomer and extending radially outwardly beyond an imafinary continuation of the discharge end of said downcomer, whereby to convert the axially moving gas discharged from the central area of said downcomer to a radially outwardly moving stream of gas, and a perforated envelope enclosing the discharge end of the downcomer and said upper plate and contiguous with the bottom plate, depending from said downcomer through which the redirected radially outwardly moving gaseous stream may pass and in so passing being further redirected in direction and reduced in velocity, said distributor, by means of said structure, co-operating with and being located within said movable hood to redirect and convert a stream of gas at a high velocity and of small cross section to an outwardly radiating stream of gas at a low velocity distributed over the surface of the bed of contact material.

2. Apparatus comprising: a reactor comprising a shell, inlet means, outlet means, and a static bed of catalyst material situated between said inlet means and said outlet means; a mixing system completely external to said reactor and connected to said inlet means, said external mixing system comprising a conduit divided into three portions, first inlet means for admitting a first gas into a first portion of said conduit, a second inlet means for admitting a second gas into a second portion of said conduit and third inlet means for admitting a third gas into said first portion of said conduit, first orifice means in said conduit located immediately upstream of said second inlet means through which said first gas must pass from said first portion of said conduit to said second portion of said conduit whereby said first gas comes into contact with said second gas and results in an intimate admixture of said first gas and said second gas, and second orifice means in said conduit located immediately downstream of said second inlet means through which said intimate admixture of said first gas and said second gas must pass from said second portion of said conduit to a third portion of said conduit, whereby said intimate mixture of said first gas and said second gas is maintained in such intimate admixture; and an internal distribution system completely within said reactor and connected to said inlet means, said internal distribution system comprising a downcomer attached to said inlet means, the cross-sectional area of said downcomer being small in comparison to the cross-sectional area of said reactor, a segmented hood, said hood comprising a plurality of sectors each independently movable between a closed operative position in which the hood assumes a frusto-conical cross section and an open access position, in which the hood assumes an open cylindrical cross section, surrounding the discharge end of said downcomer co-axial therewith to extend downwardly and radially to the walls of the shell to lie adjacent to the peripheral area of said bed while being movable along the longitudinal axis of the downcomer, and a distributor, said distributor comprising an upper annular plate located downstream of the discharge end of said downcomer projecting inwardly into the path of gas discharged from the peripheral area of the downcomer and projecting outwardly beyond an imaginary continuation of the surface of the discharge end of the downcomer whereby to convert the peripheral portion of said axially moving gas to a radially outwardly moving stream of gas while permitting the central portion of said axially moving gas to pass unhindered therethrough, a bottom perforated plate lying in the path of gas discharged from the central area of the downcomer and extending radially outwardly beyond an imaginary continuation of the discharge end of said downcomer, whereby to convert the axially moving gas discharged from the central area of said downcomer to a radially outwardly moving stream of gas, a plurality of circumferentially spaced walls located between the upper plate and the bottom plate and extending radially outwardly from the inner periphery of the upper plate to the outer periphery of the bottom plate, a plurality of circumferentially spaced walls located between the upper plate and the mouth of the downcomer and extending radially outwardly from the periphery of the downcomer to the outer periphery of the upper plate, and a cylindrical wire mesh envelope surrounding the discharge end of the downcomer and the upper plate and contiguous with the bottom plate, depending from said downcomer through which the redirected radially outwardly moving gaseous stream must pass and in so passing being further redirected in direction and reduced in velocity, said distributor, by means of said structure, co-operating with and being located within said movable hood to redirect and convert the stream of gas at a high velocity and of small cross section to an outwardly radiating stream of gas at a lower velocity distributed over the surface of the bed of contact material.

References Cited in the file of this patent

UNITED STATES PATENTS

| | | |
|---|---|---|
| 2,399,560 | Murphree | Apr. 30, 1946 |
| 2,483,948 | Underwood | Oct. 4, 1949 |
| 2,767,066 | Zimmerman | Oct. 16, 1956 |